United States Patent
Viaud

(10) Patent No.: US 6,901,719 B2
(45) Date of Patent: Jun. 7, 2005

(54) COMBINATION OF A LARGE ROUND BALER AND WRAPPING IMPLEMENT

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 106 days.

(21) Appl. No.: 10/650,251

(22) Filed: Aug. 28, 2003

(65) Prior Publication Data

US 2004/0089167 A1 May 13, 2004

(30) Foreign Application Priority Data

Aug. 28, 2002 (DE) .......................................... 102 39 454

(51) Int. Cl.⁷ .............................................. A01F 15/07
(52) U.S. Cl. ............................. 53/118; 53/587; 53/588; 53/211; 56/341
(58) Field of Search ........................... 53/116–118, 587, 53/588, 211; 56/341; A01F 15/07

(56) References Cited

U.S. PATENT DOCUMENTS

| 5,822,967 A | * | 10/1998 | Hood et al. ..................... 53/588 |
| 6,082,076 A | * | 7/2000 | Anderson et al. ............. 53/587 |
| 6,745,681 B2 | * | 6/2004 | Lucand et al. ................. 56/341 |

FOREIGN PATENT DOCUMENTS

| DE | 4021307 | 1/1992 | | |
| DE | 19654982 | 6/1998 | | |
| EP | 1050207 | 11/2000 | | |
| EP | 1210861 | 6/2002 | | |
| GB | 2232396 | * 12/1990 | ........... A01F/15/08 |
| GB | 2287926 | * 10/1995 | ........... B65B/11/04 |
| WO | WO 94/27423 | * 12/1994 | ........... A01F/15/07 |
| WO | WO 2002/076184 | * 10/2002 | ........... A01F/15/08 |

OTHER PUBLICATIONS

U.S. Appl. No. 10/281,475, filed Oct. 2002, Lucand et al.

* cited by examiner

Primary Examiner—Stephen F. Gerrity

(57) ABSTRACT

A wrapping implement is mounted to a rear location of a large round baler with connections permitting its quick attachment to, and detachment from, the baler. The wrapping implement includes a guidance ring that is essentially oriented vertically for guiding at least one wrapping material carrier about its periphery. The baler is equipped with a bale conveyor that receives a bale discharged from the baling chamber and transfers the bale to a bale carrier mounted to the guidance ring. The carrier supports and effects or permits the rotation of the supported cylindrical bale, where during the wrapping process the axis of rotation of the cylindrical bale extends perpendicular to the central axis of the circle of movement of the wrapping material carrier. The bale carrier is mounted for moving between a raised wrapping position, and a lowered discharge position, wherein in different embodiments, it respectively deposits the bale on its circumference or on its end.

17 Claims, 15 Drawing Sheets

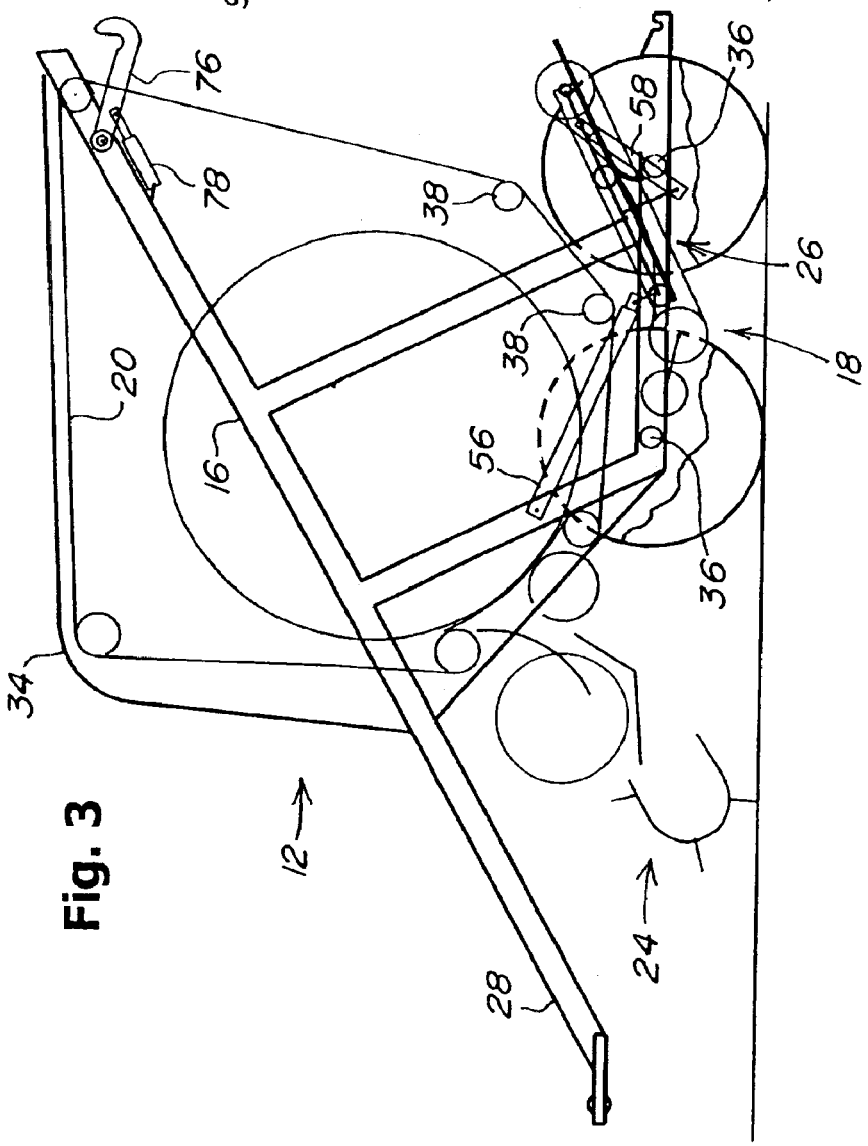

COMBINATION OF A LARGE ROUND BALER AND WRAPPING IMPLEMENT

FIELD OF THE INVENTION

The invention relates to the combination of a large round baler with a wrapping implement.

BACKGROUND OF THE INVENTION

DE 196 54 982 A1 discloses a wrapping arrangement for a small bale of grass or straw, that can be attached to a vehicle and wraps small bales, having either a circular or a rectangular cross section, with foil. For this purpose, the small bales are lined up in the form of a queue, aligned with each other with their end faces, but may also be wrapped individually. It is not apparent how the small bales are brought into this position and it seems that these small bales are of a small diameter.

DE 40 21 307 A1 reveals a large baler with a comparable wrapping arrangement for slab-shaped bales, that are conducted to the wrapping arrangement in the same way and wrapped by it.

Another embodiment of a large round baler, combined with a wrapping arrangement, is revealed by U.S. Pat. No. 5,822,967 A1, in which indeed two rolls with wrapping material rotate about a vertical axis and the cylindrical bale can be rotated about a horizontal axis during the wrapping process. An arm to take up the wrapping arrangement extends considerably beyond the large round baler, even in a non-operating position, which is not conducive to permit good maneuverability. Furthermore, the rotating arms with the rolls must be brought to the side in a non-operating position during each loading and unloading process of the large round baler.

EP 1 210 861 A2 is a large round baler with a wrapping arrangement attached at the rear that can be removed for a non-operating condition. During operation, however, the combination provides a great length of the entire vehicle train.

EP 1 050 207 A2 discloses a bale wrapping arrangement, in the form of a trailer, that can be coupled behind an agricultural tractor, and raises cylindrical bales lying on the ground by means of a fork to a wrapping table.

The problem underlying the invention is that known round balers are not, or cannot be equipped with, a wrapping implement in a space-saving manner.

SUMMARY OF THE INVENTION

According to the present invention, there is provided a novel large round baler and wrapping implement combination.

An object of the invention is to combine a large round baler with a wrapping implement in such a way that the overall length of the combination is kept at a minimum, with the large round baler forming and discharging bales prior to them being wrapped.

This object is accomplished in part by orienting an annular guide, about which wrapping material carrier or carriers travel nearly vertical adjacent a rear end of the baler so that the formed bale passes through the guide.

The wrapping implement is mounted for being easily disconnected from the baler, so that when the wrapping function is not required, the weight and extra length due to the wrapping implement can be removed.

The bale, when in a position to be wrapped, can be rotated by the wrapping implement alone by at least one bale support roller. This roller is mounted on a bale carrier that is located inside the orbit of the wrapping material carrier or carriers. The roller can be smooth, provided with conveyor studs, or otherwise designed to achieve or promote a rotational movement of the round bale. The roller is driven if the round bale does not otherwise rest on a driven roller, or the like, of the round baler.

If the carrier can be repositioned relative to the guidance ring, it is possible to bring the cylindrical bale into various positions relative to it. This also makes it possible to deposit the cylindrical bale on the ground or even to lift it up.

The wrapping implement, when disconnected from the baler, can be parked with the wrapping material carrier annular guide in an upright position where the wrapping implement can possibly be driven. When the wrapping implement is parked, the bale carrier may be positioned to support the annular guide in its upright position. If a wrapping operation is to be conducted, it is prudent to provide another support for stabilizing the annular guide. Such a support can optionally, and in a known manner, be variable in length and/or adjustable with an outside force.

While it would indeed be possible for the round bale to fall or roll directly on the carrier of the wrapping implement after discharge from the baling chamber, the presence of a conveyor between the baler and the bale carrier is helpful so that the round baler is immediately available for forming the next bale.

By means of a vertical swiveling or pivoting motion of the conveyor, the round bale can be simply brought from a lower into an upper position, namely raised and finally dumped out.

Although the conveyor could be installed on the wrapping implement and thus could be readily designed as an individual device detached from the round baler, it is quite advantageous if it is installed on the round baler because it can then serve as a discharge ramp also if the wrapping implement is dismounted from the baler.

The use of a buttress on the carrier provides the advantage that the cylindrical bale does not fall off the carrier during a repositioning of the carrier, for example, for the unloading of the cylindrical bale, which otherwise could possibly occur if the spacing between the pulley and the roll should change.

A circulating movement of the wrapping material carrier along a circular path can be generated by the guidance ring if it is provided with a rotating ring that can be rotated by a motor in a slotted guidance housing. The wrapping material carrier conventionally is a spool, supported in bearings, free to rotate, on which hundreds or thousands of meters of stretch foil or the like are wrapped. For the guidance ring, one or more wrapping material carriers may be provided. The slot in the guidance housing may be provided on a radially inner, as well as a radially outer, side of the guidance housing, that is, also on a forward or a rear end face. By the same token, an Omega-shaped or Hat-shaped profile could be used; the essential thing is only that the ring is guided and can accommodate at least one wrapping material carrier. On the other hand, the guidance housing can also be enclosed by a wrapping material carrier that then moves as on a rail or along a pipe, rod or the like. The movement can be produced by means of a rope pull, a chain or by means of a friction drive or a gear motor. The velocity of the wrapping material carrier may be constant as well as variable, and may conform, for example, to the number of wrapping material carriers used.

In order for the cylindrical bale to be held, on the one hand, by a carrier, and on the other hand, be enclosed, trouble free, by enveloping material, the carrier is equipped with a frame or configured as a frame, that leaves an interior space through which the wrapping material carrier can be moved during the wrapping operation. Accordingly, the components of the frame, such as transverse and lengthwise struts, are located outside the path of movement of the wrapping material carriers. The frame may always be configured in that way or it may be arranged in that way only for the wrapping operation. The frame is not necessarily a closed structure; a fork-shaped or other configuration can also be considered, as long as it guarantees that the cylindrical bale is carried safely.

If the guidance ring is to be transportable, and if necessary, can be attached to another implement, this can be accomplished basically as a permanent attachment or be difficult to remove. However, assembly time can be saved and flexibility can be increased if the guidance ring or quick connection devices are provided, such as hooks, couplings, pin connections, etc. Elements that are advantageous and reliable include, for example, elements that are used for the attachment of tools to front loaders or three-point implement hitches. Analogously the wrapping implement could also be attached to a front loader and be easily transported. Similarly, the connection at the outlet of a large round baler or another type of baler is possible that produces, for example, slab-shaped bales.

The cylindrical bale or basically any bale can be deposited on various surfaces, for example, its circumferential surface or one of its end faces. The deposit on an end face has the advantage that the cylindrical bale does not roll away when deposited on a slope. Such a deposit can be attained if the carrier is attached to the guidance ring at its circumferential direction so as to be repositioned and thereby changes the inclination of the longitudinal centerline of the cylindrical bale during the deposit process, until it is tilted onto its end face.

In an alternative way, the bale can be deposited on its end face if the carrier can be adjusted vertically relative to the ring guidance, in particular, pivoted.

Particularly, with cylindrical bales having a small diameter, an ejection sleeve provides the assurance that the cylindrical bale does not remain in the interval between the pulley and the roll when the carrier is moved for the deposit of the cylindrical bale. This ejection sleeve is brought into contact with the cylindrical bale as soon as the cylindrical bale is to leave its wrapping position. This can be performed at that time and to that degree that the carrier is repositioned, that is, it depends on this. It can also be performed by means of a pusher or the like that can act upon the cylindrical bale under the control of outside force.

An actuating arrangement may be flexible if it is supported, for example, by a gas spring or a mechanical spring or by a pressurized medium such as oil or air that escapes while being throttled by valves, etc. This flexibility has the advantage that the impact of an oncoming cylindrical bale is damped and that either a free-standing wrapping implement remains standing safely or that an attached wrapping implement does not transmit excessive forces to the connections.

If the rotational speed of the pulley or the roll can be varied, either manually or automatically, the number and the overlap of the layers on the cylindrical bale can be varied or maintained at a constant value in case of a failure of a wrapping material carrier. Difficult conditions at the beginning or the end of the wrapping process can also be considered.

The repositioning of the location of the pulley makes it possible to position the bale that is to be wrapped correctly on the carrier as well as to assure that it lies on the carrier at the correct angle and thereby safely. The repositioning is performed preferably by means of stepper motors and automatically, but can be performed in a simple version by means of a perforated rail or perforated plate or by means of a clamping arrangement.

BRIEF DESCRIPTION OF THE DRAWINGS

The drawing is several embodiments of the invention that shall be described in greater detail in the following.

FIG. 3 is a schematic left side view of the large round baler without the wrapping implement.

FIG. 4 is a schematic left side view of the wrapping implement detached from the large round baler.

DESCRIPTION OF THE PREFERRED EMBODIMENT

Figure 1:
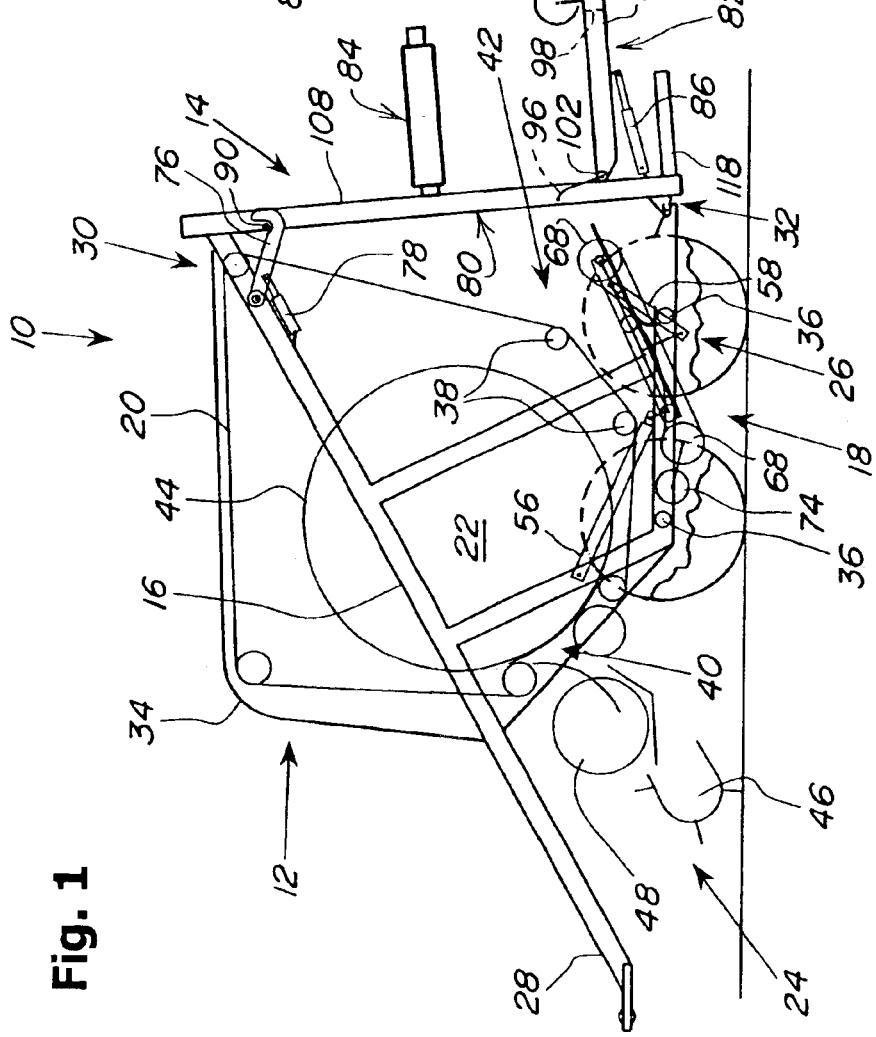
FIG. 1 is a schematic left side view of a combination of a large round baler and a wrapping implement according to a first embodiment with a conveyor.

Referring now to FIG. 1 there is shown a combination 10 of a large round baler 12 and a wrapping implement 14.

The large round baler 10 is preferably configured according to U.S. patent application Ser. No. 10/281,475, filed Oct. 25, 2002, whose disclosure is hereby incorporated herein. Basically the large round baler 10 may, however, be of any conventional configuration with a fixed or a variable baling chamber and may be applied in agriculture as well as in industrial operation. For this purpose, the large round baler 10 is provided with a frame 16, a chassis 18, baling elements 20, a baling chamber 22, a supply arrangement 24, and a conveyor 26.

The frame 16 is formed by a welded and/or bolted assembly that ends at the front in a towbar 28, is connected at the bottom with the chassis 18, and is provided at the rear with upper and lower connecting points 30, 32. The frame 16 includes side walls 34 that are not described in any further detail. The side walls 34 form opposite sides of a baling chamber 22. In the region of the upper connecting point 30 on each side of the frame 16, there is a hook element 76 that opens upwardly and is pivotally mounted for being repositioned by an actuating arrangement 78.

The chassis 18 can be configured in a tandem axle configuration with two axles 36, as shown, or it may be provided with only a single sprung or unsprung axle 36 that carries a wheel on each side. The chassis 18 is located underneath the baling chamber 22 and is offset to the rear of it.

In the embodiment shown, the baling elements 20 are configured as endless, flexible tensioning means, for example, as belts, bands, bar chains, etc., and generally surround and thereby define, the circumference of the baling chamber 22. The baling elements 20 are conducted over rolls 38, whose position is in part rigid and in part movable. The use of rolls 38 that are movable in their attachment results in a baling chamber 22 of variable size. The movable rolls 38 are engaged by pivoted arms, in a way not shown, and repositioned as a function of operating condition. In the forward region of the baling chamber 22 facing the supply arrangement 24, the baling elements 20 leave an inlet 40, through which crop to be baled can be conveyed into the baling chamber 22. In the rear lower region of the baling chamber 22, an outlet 42 is formed when the corresponding rolls 38 are raised with the baling elements 20 and thereby open the baling chamber 22.

The baling chamber 22 is variable in its size since the baling elements 20 are flexible. Instead of that, a baling chamber 22 could be formed whose size is invariable, and is surrounded, for example, by rolls or bands on axes that are unchangeable in their location. The baling chamber 22 is oriented in such a way that a cylindrical bale 44 contained in it rotates about a horizontal, central, cylindrical axis that extends transverse to the direction of operation.

In this embodiment, the supply arrangement 24 contains a take-up device 46 in the form of a so-called pick-up that is followed by a conveying arrangement 48, if necessary configured as a cutting arrangement, in order to grasp crop to be baled that is lying on the ground and convey it through the inlet 40 into the baling chamber 22, where it is formed into a cylindrical bale 44.

Figure 5:
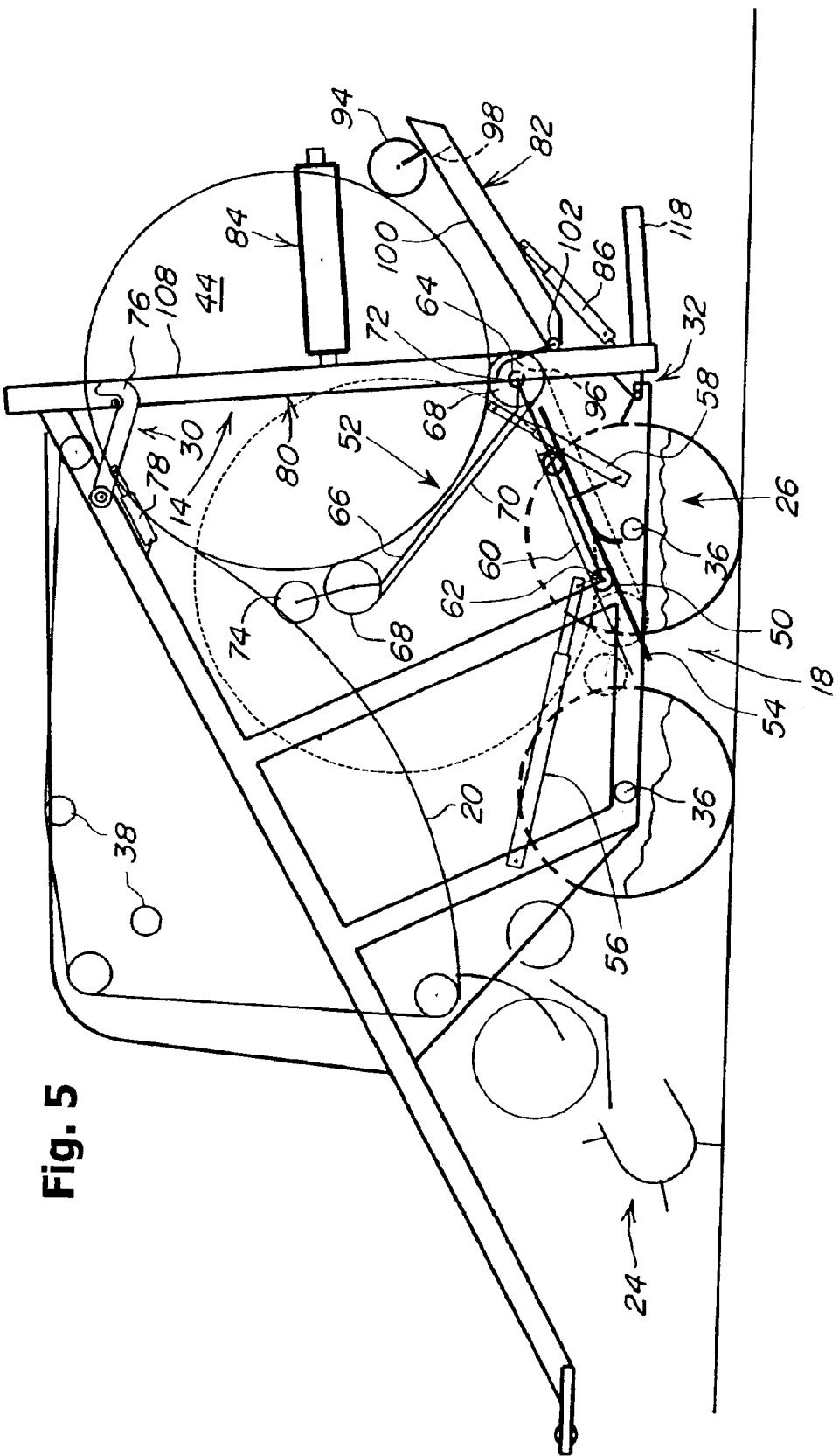
FIG. 5 is the combination according to FIG. 1 during the transfer of a cylindrical bale from the large round baler to the wrapping implement.

As is illustrated in FIG. 5, the conveyor 26 is provided with a frame 50, a conveying table 52, a guide arrangement 54, a first actuating arrangement 56, and a second actuating arrangement 58. The assignment of the conveyor 26 consists of taking up a cylindrical bale 44 delivered by the baling chamber 22, and to either convey it to the wrapping arrangement 14 or to deposit it on the ground.

The frame 50 is configured as a two-piece component and includes a slide 60 with rolls 62, that is connected in a bearing 64 with a pivoting frame 66 so as to pivot vertically. The slide 60 with its rolls 62 is engaged in the guide arrangement 54 and can be moved inclined to the ground in the direction of operation. The rolls 62 are attached to the slide 60 in such a way that they are still retained in the guide arrangement 54 in each end position of the slide 60. In a simplified configuration, guide shoes or the like may also be provided in place of the rolls 62.

The conveying table 52 contains at least two rolls 68 that are spaced from each other at a distance of less than the diameter of a completed cylindrical bale 44 and are mounted, free to rotate, on the pivoting frame 66. In the preferred embodiment, an endless, flexible band 70 is slung over the rolls 68 that bridges the spacing between the rolls 68 and sags to a small amount. Fundamentally, such a band 70 is not required, and in its place, further rolls could be provided in case that the spacing is then to be bridged. An axis of rotation 72 of the roll 68 facing the wrapping implement 14 is used simultaneously as a bearing 64. On the side of the pivoting frame 66 facing away from the wrapping implement 14, a further roll 74 is provided alongside the roll 68 that is remote from the axis of rotation 72. The roll 74 may be provided with a smaller diameter than the remaining rolls 68 and is offset relative to a plane through the axes of rotation of the rolls 68, so that a trough shape results in the shape of the conveying table 52. The conveying table 52 can occupy a lower end position inclined forward and downward (see FIG. 5 in dashed lines), in which the cylindrical bale 44 is accepted from the baling chamber 22, and an upper end position inclined upward and to the rear (see FIG. 5 in solid lines), in which it can deliver the cylindrical bale 44 into the wrapping implement 14. The rolls 68 may be configured as free to rotate or may be driven. In the preferred embodiment, the rear roll 38 is driven, for example, by means of a hydraulic motor.

Figure 8:
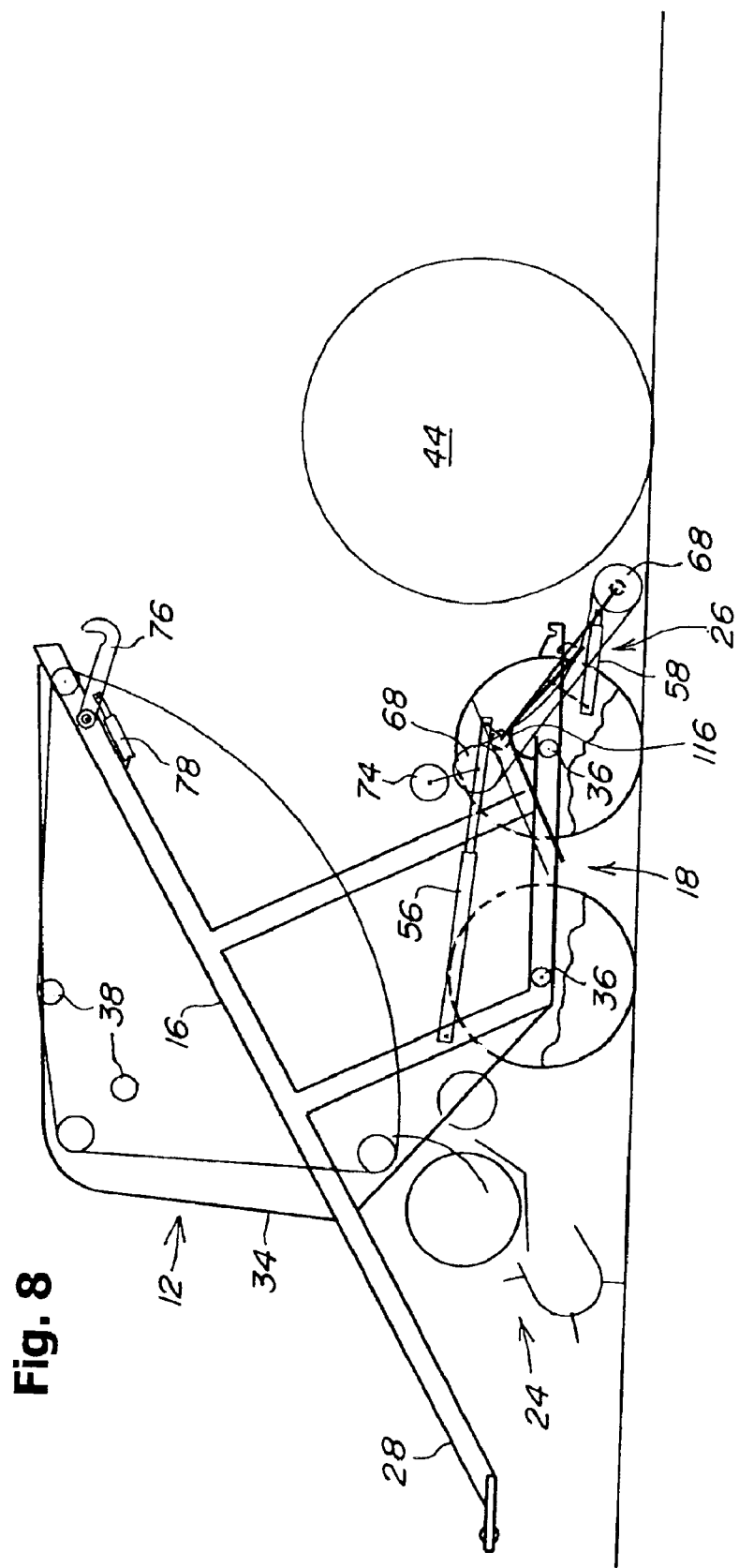
FIG. 8 is the large round baler of the combination according to FIG. 1 with the conveyor and without the wrapping implement during the ejection of a cylindrical bale.

In the simplest case, the guidance arrangement 54 consists of two U-shaped rails extending parallel to the longitudinal center plane of the large round baler 12 that can be bolted to the frame 16 of the large round baler 12 and that are open toward its longitudinal center plane. The guidance arrangement 54 extends at a small inclination of, for example, 30° from the ground upward and to the rear and extends above the rear axle 36. The interior of the guidance arrangement 54 is appropriate to take up the rolls 38, free to rotate. The guidance arrangement 54 is configured in such a way that it still safely guides the slide 60 even in the operating condition according to FIG. 8. For this purpose, one-piece rails could be used that, for example, can be tilted about a horizontal bearing by means of a further actuating arrangement, not shown, if this should be necessary. In the preferred embodiment, the rails are configured in particular as can be seen in FIG. 8. According to that, the rails are two-piece components and contain a joint 116 above the rear axle 36 that connects both sections with each other so as to pivot vertically. If necessary, a section developing during the pivoting can be bridged by means of a curved piece. In this way, it is possible that the slide 60 again slides downward after the cylindrical bale 44 is raised over the rear axle 36 and deposits the cylindrical bale 44 gently on the ground.

The first actuating arrangement 56 is configured as a double-acting hydraulic motor having its cylinder end pivotally connected to the frame 16 of the large round baler 12 and having its rod end pivotally connected to the slide 60. The orientation of the first actuating arrangement 56 is selected in such a way that its change in length produces a repositioning of the slide 60 in the guidance arrangement 54. The first actuating arrangement 56 is controlled by means of electromagnetically controlled valves preferably from an on-board computer or manually. The stroke of the first actuating arrangement 56 is sufficient to move the slide 60 in both directions over the entire length of the guidance arrangement 54.

The second actuating arrangement 58 is also configured as a hydraulic motor, however, it is single-acting. The second actuating arrangement 58 has its head end pivotally to the slide 60 and has its rod end pivotally connected to the pivoting frame 66 of the conveying table 52. The second actuating arrangement 58 is used to pivot the pivoting frame 66 out of its lower end position, if necessary with the cylindrical bale 44 lying on it, into its upper end position, and to lower it under control on the basis of the force of gravity. The second actuating arrangement 58 is also controlled electrically and preferably by means of an on-board computer.

Fundamentally, the two actuating arrangements 56, 58 could also be operated mechanically, electrically or pneumatically.

At this state of the description, the operation of the conveying table 52 could already be described, that this can perform without the attached wrapping implement 14. According to FIG. 8, only the large round baler 12 is provided which holds the conveying table 52 at the outlet side of the baling chamber 22. As soon as the baling elements 20 and the rolls 38 carrying them are raised in order to open the baling chamber 22, the cylindrical bale 44 can leave it and fall onto the conveying table 52, which can also be seen in FIG. 5. The conveying table 52 is then operated to move the bale 44 to the rear over the axle 36 and slides downward on the section of the guidance arrangement 54 that is tilted downward, after crossing one-half of the path, in order to deposit the cylindrical bale 44 on the ground.

In the preferred embodiments, the wrapping implement 14 is configured as an independent unit that can be connected to the large round baler 12 in a quick assembly method without the use of tools. The wrapping implement 14 can also be configured in such a way, which is not shown, that it can be attached to a front loader or a rear loader, a telehandler, a three-point implement hitch or the like, in order to be easily removable. As can best be seen in FIGS. 2 and 4, the wrapping implement 14 includes a guidance ring 80, a carrier 82, at least one wrapping material carrier 84, a third actuating arrangement 86, and a support 88.

The guidance ring 80 has a circular cross section that is almost completely closed, but remains open only for a slot, not shown or described in any further detail, in a guidance housing 108. In the installed condition of the wrapping implement 14, the guidance ring 80 assumes an upright position of nearly 90° to the ground and is carried by the frame 16 of the large round baler 12. In place of a nearly closed cross section, an Omega profile or the like could be used. In the upper one-fourth of the guidance ring 80, a retainer 90 is provided at the guidance housing 108 that can be grasped by the hook element 76 at the frame 16 and that is configured, for example, as a pin or the like. The guidance ring 80 or the guidance housing 108 is provided with a diameter that permits the cylindrical bale 44 to pass without any change in its orientation, so that is can be deposited on the carrier 82. In the guidance housing 108, a ring 110 is located that is preferably closed and that can rotate in the guidance housing 108. The ring 110 is moved in particular by means of a hydraulically driven motor 112 that makes contact with the ring 110 through an opening in the guidance housing 108. The drive of the motor 112 is performed either by a positive locking connection, for example, a rack, pinion or through a friction locking connection, for example, friction wheel, and transmitted to the ring 110. In this embodiment, the motor 112 is located and protected in the lower region of the guidance housing 108 and is brought into motion by means of electromagnetically controlled valves, where the control signals again may originate from an on-board computer. Indeed, the motor 112, or several like motors, may be attached to other locations of the guidance housing 108, which depend on the spacial possibilities and environmental conditions (incidence of dirt, mechanical effects). The movement of the ring 110, within the guidance housing 108, can proceed with little friction if guide rolls, not shown, or the like, support and guide the ring 110. The ring 110 may consist of metal as well as a plastic. Nearly, at the lower end of the guidance housing 108, coupling elements 114 are provided at its front side for engagement with the lower connecting points 32 on the baler frame 16.

The carrier 82 includes a frame 92, a roll 94, and a side panel 96. The carrier 82 is required to carry the cylindrical bale 44 during the wrapping process and to rotate it about its cylinder axis or to engage it, free to rotate. After the wrapping process, the carrier 82 is required to deposit the wrapped cylindrical bale 44 on the ground. The carrier 82 is located at the lower one-fourth or one-fifth of the guidance ring 80.

Figure 2:
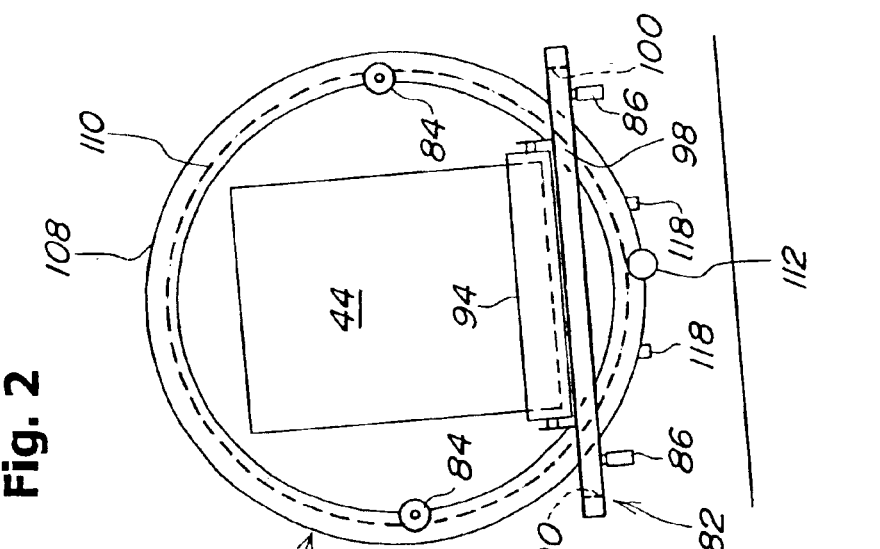
FIG. 2 is a rear view of the wrapping implement of the combination according FIG. 1.
Figure 7:
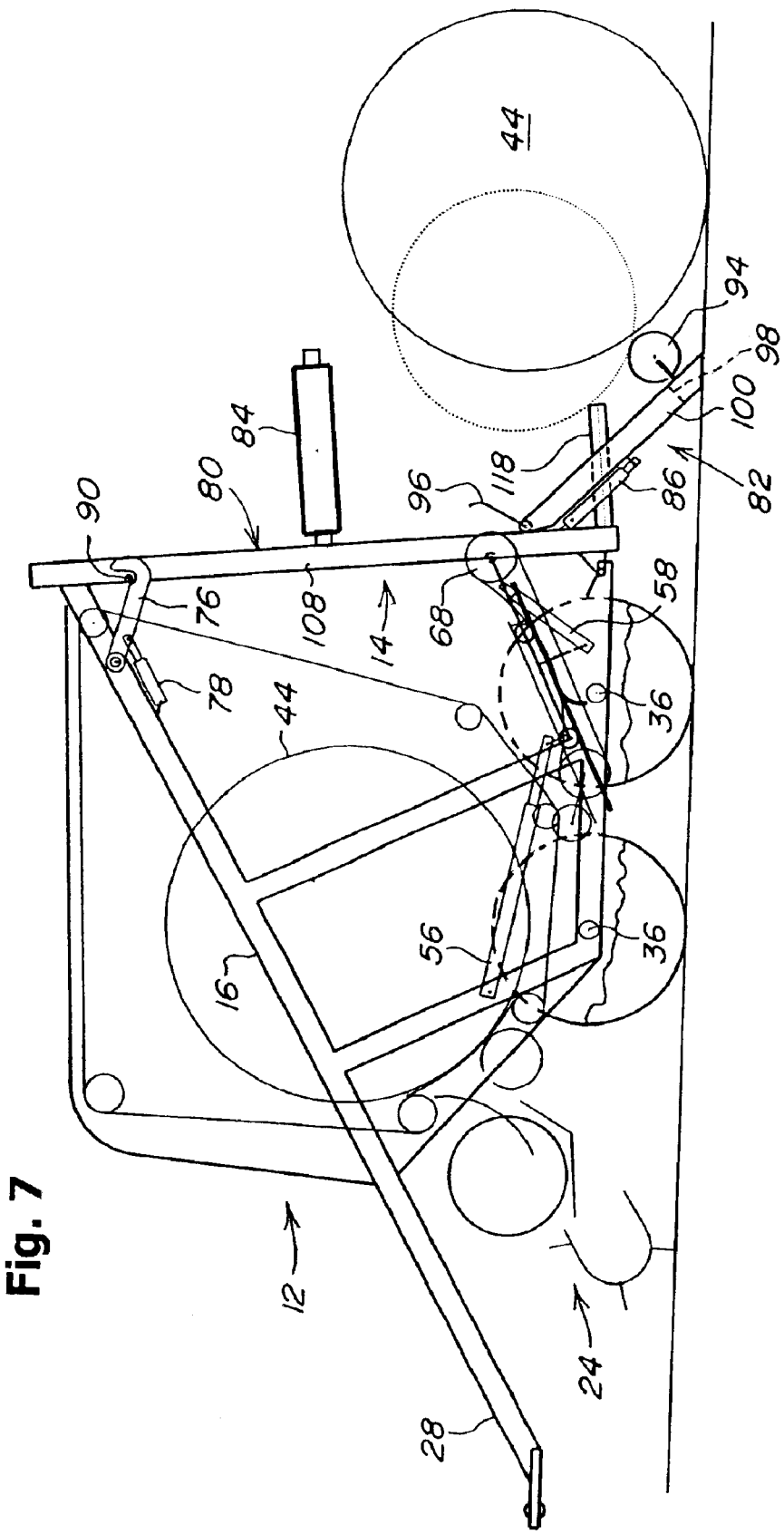
FIG. 7 is the combination according to FIG. 1 during the ejection of a cylindrical bale from the wrapping implement.

As can be seen in FIG. 2, the frame 92 is provided with a transverse strut 98 and lengthwise struts 100 in a horizontal position. The transverse strut 98 is located at such a distance from the guidance ring 80 that the wrapping material carrier 84 can be moved through the interior space. The transverse strut 98 has a length approximately equal to the diameter of the guidance ring 80. The lengthwise struts 100 connect the transverse strut 98 with the guidance ring 80. For this purpose, the lengthwise struts 100 extend in the direction of operation and engage the guidance ring 80 in a bearing 102 so as to pivot vertically. For this purpose, the lengthwise struts 100 are bent at right angles, if necessary, from the forward end region towards the guidance housing 108 or pillow blocks are applied to the latter that bridge the sideways distance between the guidance housing 108 and the lengthwise struts 100. Within the space enclosed by the frame 92 in the plan view and connected to the rear side of the guidance housing 108, an ejection sleeve 118 is located. This ejection sleeve 118 consists of a small rigid frame that projects beyond the lengthwise struts 100 and projects beyond the enclosed space, when the carrier 82 is tilted downward (see FIGS. 4 and 7). This ejection sleeve 118 prevents a small cylindrical bale 44 from resting on the rear roll 94 even when the carrier 82 has been tilted downward. Rather, upon the lowering of the carrier 82, its center is moved over the roll 94 so that it rolls down from the carrier 82.

The roll 94 is applied to the transverse strut 98, free to rotate, in pillow blocks and extends horizontally transverse to the direction of operation of the combination 10. Hence, it is in contact with the circumferential surface of the cylindrical bale 44 that was taken up. The roll 94 is approximately as wide as the cylindrical bale 44 and is driven in case that the roll 38 is not driven.

The panel 96 is configured as a bow, a sheet metal shoulder or the like, and is located on the opposite side of the frame 92 from the roll 94. The panel 96 is formed or attached in such a way that it is supported on the rear pulley 68, on its axis of rotation or the like, during corresponding positions of the conveying table 52 and the carrier 82, as this is shown in FIG. 5. For this purpose, the panel 96 need not extend over the entire width of the pulley 68. The requirement of the panel 96 is to retain the cylindrical bale 44 on the carrier 82 even after the conveying table 52 is again tilted forward and downward. The position of the panel 96, with the rear roll 68 and the pulley 94, are selected in such a way that they position the cylindrical bale 44 during the wrapping process centrally to the path of movement of the wrapping material carrier 84.

As can be seen in FIG. 4, the wrapping material carrier 84 includes a spindle 104 and a wrapping material roll 106. In addition, and not shown, on the wrapping material carrier 84, there is also a pre-loading arrangement, a cutting arrangement and/or a contact pressure arrangement as these are known in themselves. The spindle 104 is fastened in the axial direction on the ring 110, extends through the slot in the guidance housing 108, and carries the wrapping material roll 106 in its outer region, free to rotate and secured axially. The wrapping material roll 106 consists of a considerable length of wrapping material wrapped onto the roll consisting of plastic that is commercially available.

A third actuating arrangement 86 is also configured as a hydraulic cylinder and has its head end pivotally coupled to the guidance housing 108 and has its rod end pivotally coupled to the underside of the carrier 82. As are the other actuating arrangements, the third actuating arrangement 86 is preferably controlled electromagnetically by means of an on-board computer. By means of the third actuating arrangement 86, the carrier 82 can be brought into an intermediate position, in which it extends generally vertically to the plane of the principal extent of the guidance housing 108, as shown in FIG. 1, and can be brought into a raised position, wherein it is displaced approximately 30° upward from its intermediate position, as shown in FIG. 5. The carrier 82 can also be moved to a lowered position, wherein the carrier 82 is used as a support for the guidance ring 80 when the latter is detached from the baler 12. The third actuating arrangement 86 may be equipped or connected with a pressure accumulator so that it can deflect under pressure in a direction, particularly a downward direction.

The support 88 is attached in the lower half of the guidance housing 108. It may consist of two individual legs or struts or it may consist of a U-shaped bow that folds away from the plane of the guidance housing 108 to the front and can be locked by means not shown. As can be seen, in particular from FIG. 4, the result is that the wrapping implement 14 in the unassembled condition rests in front on the support 88 and at the rear on the carrier 82 or the lengthwise struts 98 and/or transverse struts 100.

On the basis of the foregoing description, the first embodiment operates as follows, where in addition it should be noted that in every case, the cylindrical bale 44 is wrapped or enclosed in net before its release from the baling chamber 22 in order to maintain its compact and cylindrical shape. The combination 10 and the wrapping implement 14 could operate without this wrapping or enveloping process, but the quality of the bale would be worse.

The large round baler 12 can be driven individually or in the combination 10 with the wrapping implement 14. If it is operated individually, only the conveyor 26 is attached that can take up the cylindrical bale 44 and deposit it on the ground, as was described above.

When the large round baler 12 and the wrapping implement 14 are connected with each other, the conveyor 26 is not used to deposit the cylindrical bale 44 on the ground, but is used for its transfer to the wrapping implement 14.

Figure 6:
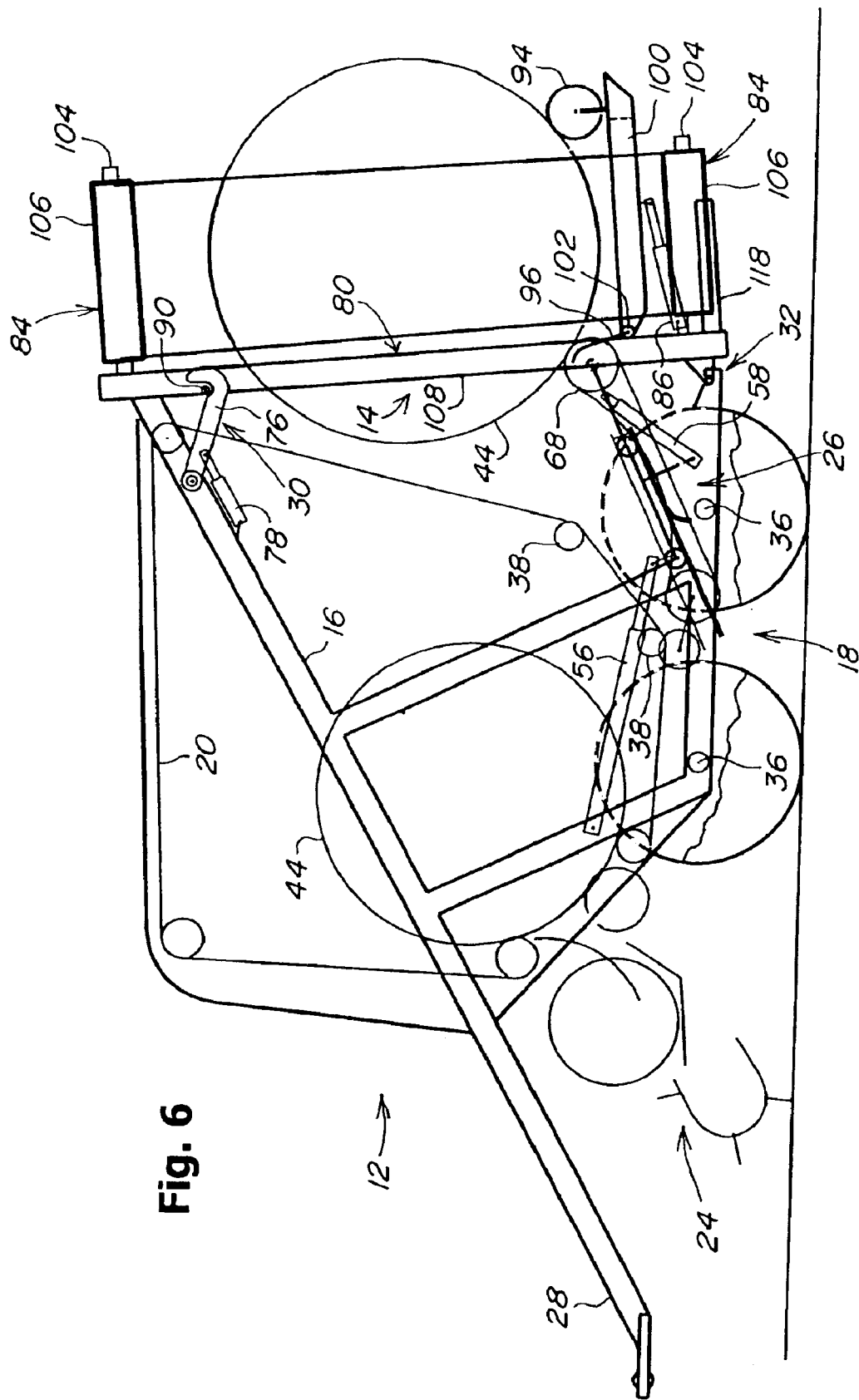
FIG. 6 is the combination according to FIG. 1 during the wrapping of the cylindrical bale in the wrapping implement.

According to FIG. 5, the slide 60 is located in its forward, lower acceptance position for the acceptance of the finished cylindrical bale 44 from the baling chamber 22. As soon as the cylindrical bale 44 reaches the conveying table 52, it is in contact with the forward, further roll 74 and cannot roll down off the conveyor 26 when this is conducted by means of the first actuating arrangement 56 at an angle to the rear within the guidance arrangement 54. As soon as the slide 60 has reached its rear and upper end position, the second actuating arrangement 58 is extended so that the slide 60 tilts upward at the front about the bearing 64, and the cylindrical bale 44 lies upon the carrier 82. When it is lying on the carrier 82, the latter is pivoted upward at the rear through approximately 30°, and the panel 96 lies on the rear roll 68 or in its region so that no troublesome gap develops between the conveying table 52 and the carrier 82. In this condition, the load carrying surfaces of the conveying table 52 and the carrier 82 extend in the shape of a throat to each other, so that the cylindrical bale 44 is grasped securely and cannot roll down. If the third actuating arrangement 86 interacts with a pressure accumulator, which is not necessarily required, it deflects slightly under the impact of the cylindrical bale 44, and reduces its impact somewhat. Then, the cylindrical bale 44 rests on the rear roll 68 of the conveying table 52 and the roll 94, where its center of gravity is located between the two. Following this, the carrier 82 is lowered into its position perpendicular to the guidance housing 108, in which it continues to rest on the roll 68 and the roll 94, as is shown in FIG. 6. In the position according to FIG. 6, the roll 68 or the pulley 94 is driven so that the cylindrical bale 44 will rotate about its central cylindrical axis extending horizontally, transverse to the direction of operation of the combination 10. Following this, the ring 110 in the guidance housing 108 is brought into rotation by means of the motor or motors 112, so that the wrapping material carriers 84 are moved along a vertical track about the cylindrical bale 44 and apply foil to it in a known manner. Since this is known in itself, the application, pressing and cutting of the foil will not be further explained. It can be seen that the large round baler 12 in this position can already be operated to form a new cylindrical bale 44, although the present cylindrical bale 44 is still being wrapped. During the wrapping process, the wrapping material carriers 84 also move through the interior space enclosed by the frame 92. When the wrapping process has been completed and the foil has also been separated, the third actuating arrangement 86 is retracted and thereby the carrier 82 is lowered. During the lowering of the carrier 82, it retracts behind the rear edge of the ejection sleeve 118, so that the cylindrical bale 44 receives an additional impulse to the rear and rolls over the pulley 94 out of the region of the carrier 82. Now the wrapping and depositing process is completed and a further cylindrical bale 44 can be accepted and wrapped.

The further description concerns the second embodiment which generally corresponds to the first embodiment; differences exist in the repositioning of the slide 60, the conveying table 52, and in the position of the carrier 82 during the take-up of the cylindrical bale 44.

Figure 9:
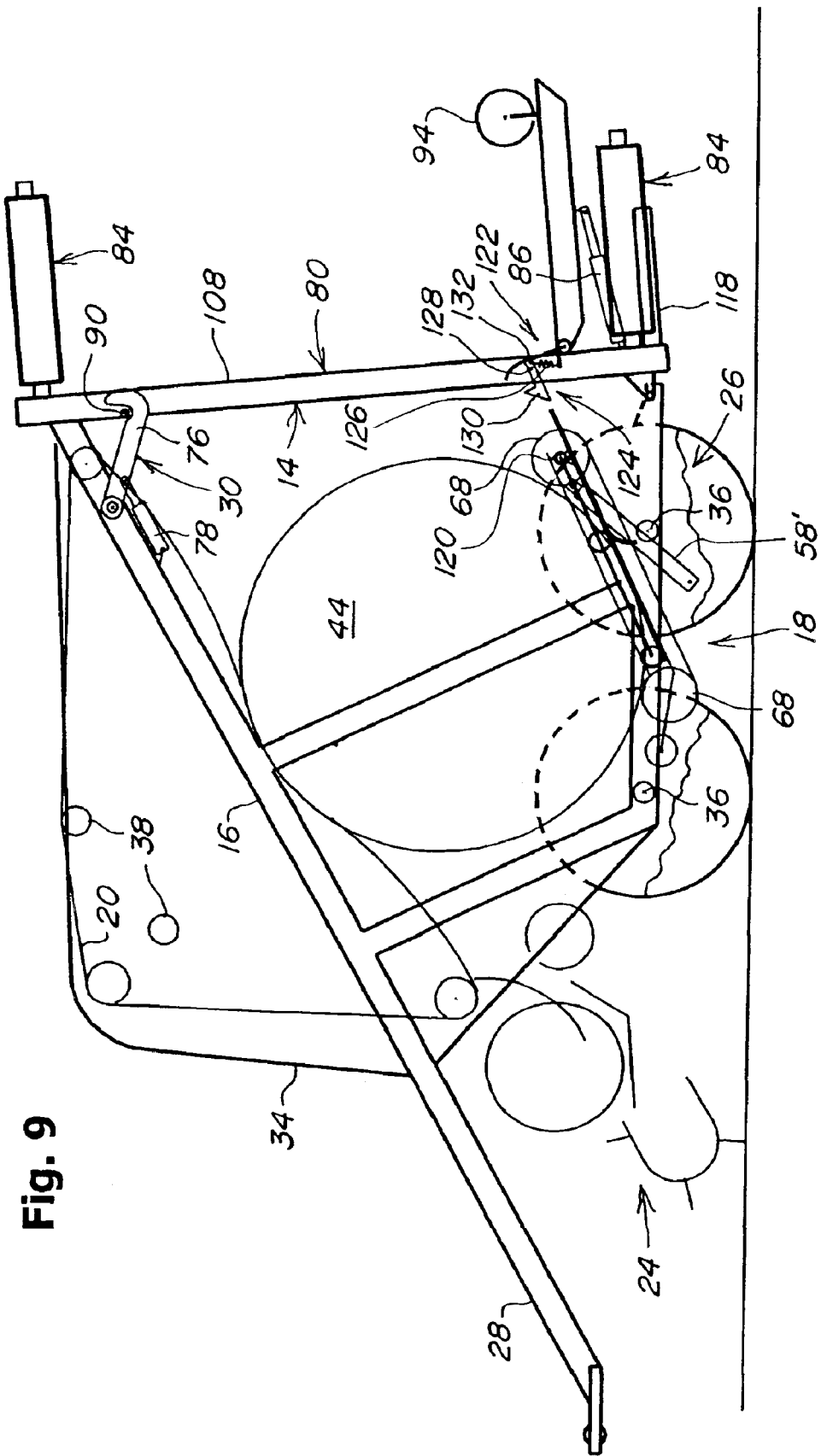
FIG. 9 is a schematic left side view of a combination of a large round baler with a wrapping implement according to a second embodiment with a conveyor.

Thus, referring to FIG. 9, it can be seen that in place of two actuating arrangements 56 and 58, only a single actuating arrangement 58' is used, that is connected in joints and configured as a hydraulic motor in the same way as the second actuating arrangement 58 according to the first embodiment. However, the actuating arrangement 58' is provided with a considerably longer stroke and is preferably double-acting. Furthermore, a retainer 120 is attached to the slide 60, in particular, at least on one side. Finally, a locking arrangement 122 is provided on the guidance housing 108.

The locking arrangement contains at least one hook 124 and a linkage 126. The same number of hooks 124 as of retainers 120 are provided, and the hook or the hooks 124 are arranged and configured in such a way that in each case they are able to overlap a retainer 124 in a positive lock and retain it. Each hook 124 can pivot vertically about a bearing 128 and is provided with a hook nose 130 extending from the bearing 128 to the front and a lever 132 extending to the rear. Each hook 124 is attached to the guidance housing 108, preferably on its outside, so as to pivot vertically, in particular, in such a way that it can grasp the retainer 120 with the hook nose 130 when the wrapping implement 14 is attached to the large round baler 12 and the slide 60 is moved to the rear up to the stop at the guidance housing 108. Although the drawing is a hook nose 130 that is open upwards, a hook-nose opening downward could also be used.

At least one linkage 126 is provided that is configured as a compression spring in this embodiment and that is arranged between the lever 132 and an extension of the frame 92 projecting forward beyond the bearing 102. Instead of being configured as a compression spring, the linkage could also be configured as a rod, a rope pull, an extension spring, a rocker arm or the like. The essential thing here is that a relationship be established between the position of the hook 124 and of the carrier 82. It is possible that two hooks 124 are provided, but that are controlled together, so that only one linkage 126 is required.

In contrast to the illustration of FIG. 5 for the first embodiment, the carrier 82 is not raised when taking up a cylindrical bale 44, but remains in its generally horizontal position. However, the operation of the actuating arrangement 86 as a shock absorber is preferably maintained.

Figure 10:
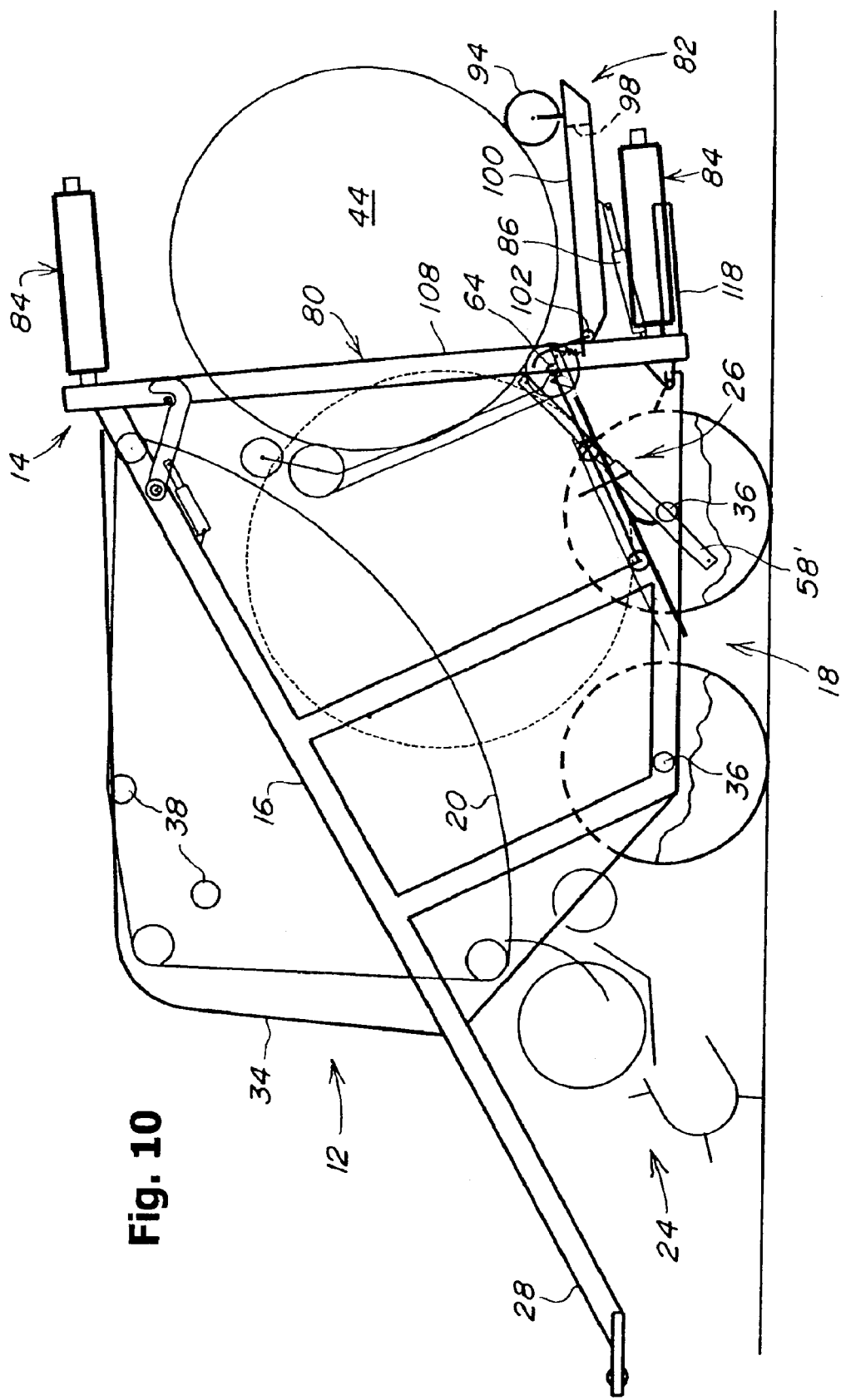
FIG. 10 is the combination according to FIG. 9 in a transfer condition of the conveyor.
Figure 11:
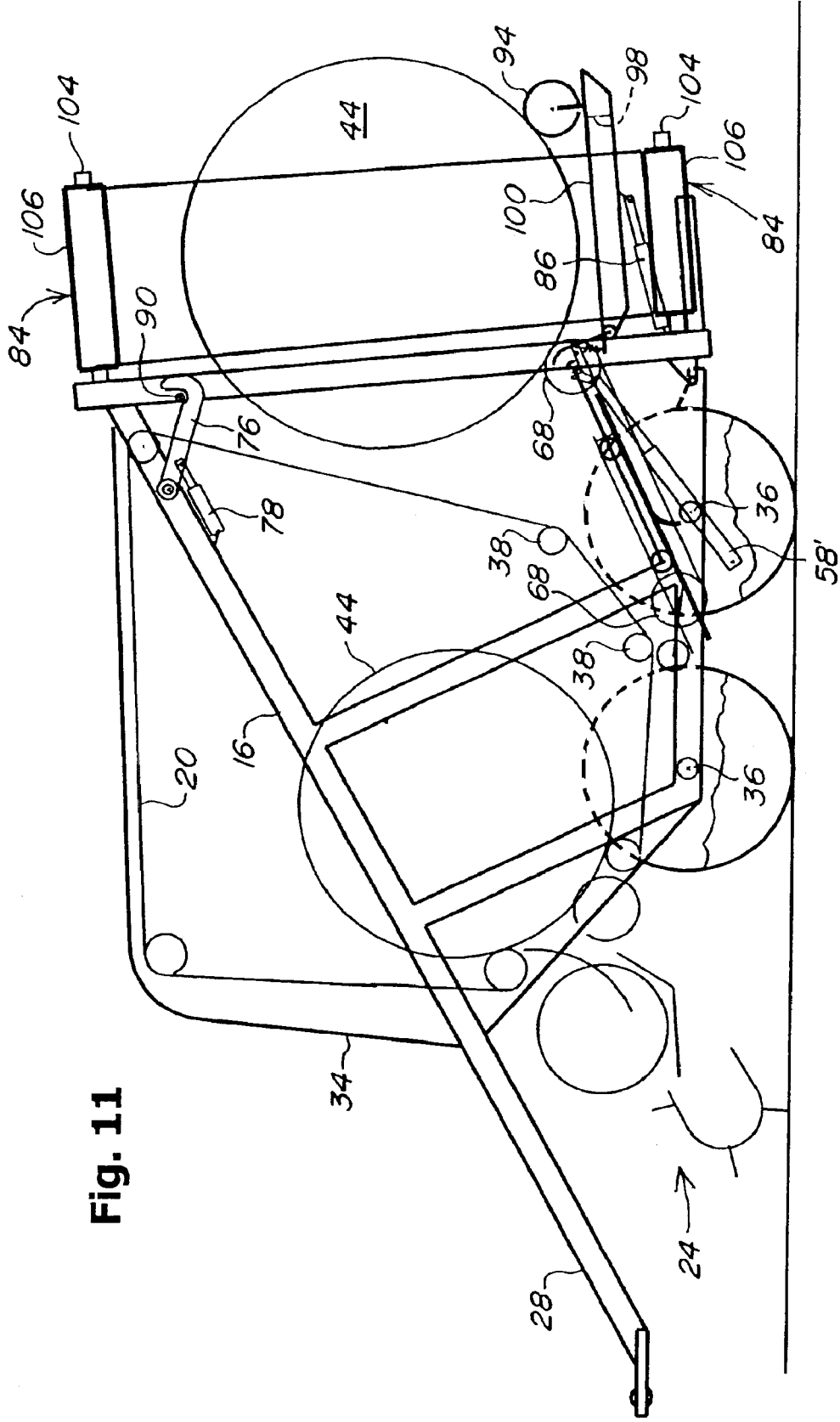
FIG. 11 is the combination according to FIG. 9 during a wrapping operation.
Figure 12:
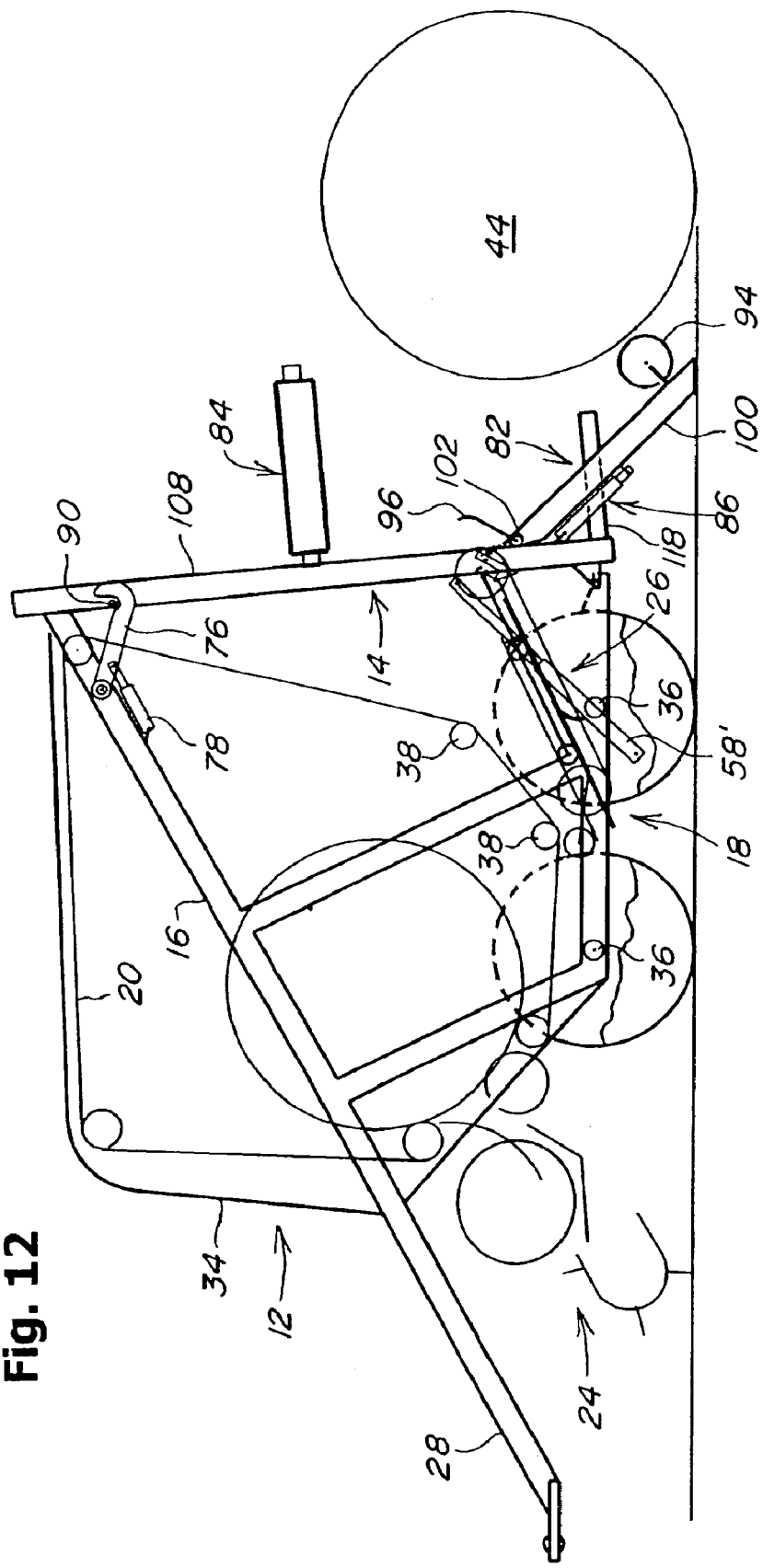
FIG. 12 is the combination according to FIG. 9 during the unloading of a cylindrical bale.
Figure 13:
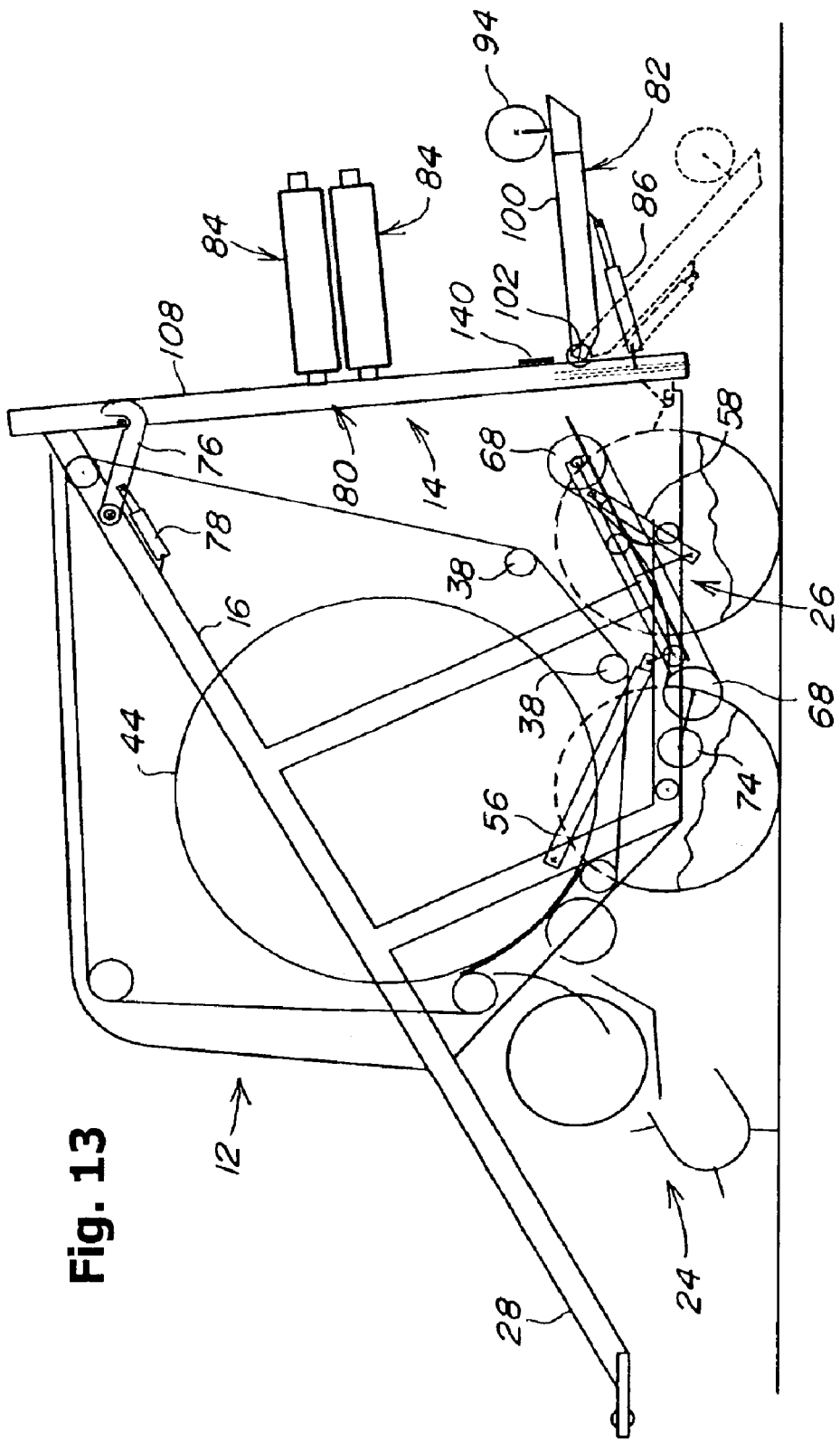
FIG. 13 is a schematic left side view of a combination of a large round baler with a wrapping implement according to a third embodiment with a conveyor and a pivoted carrier.
Figure 14:
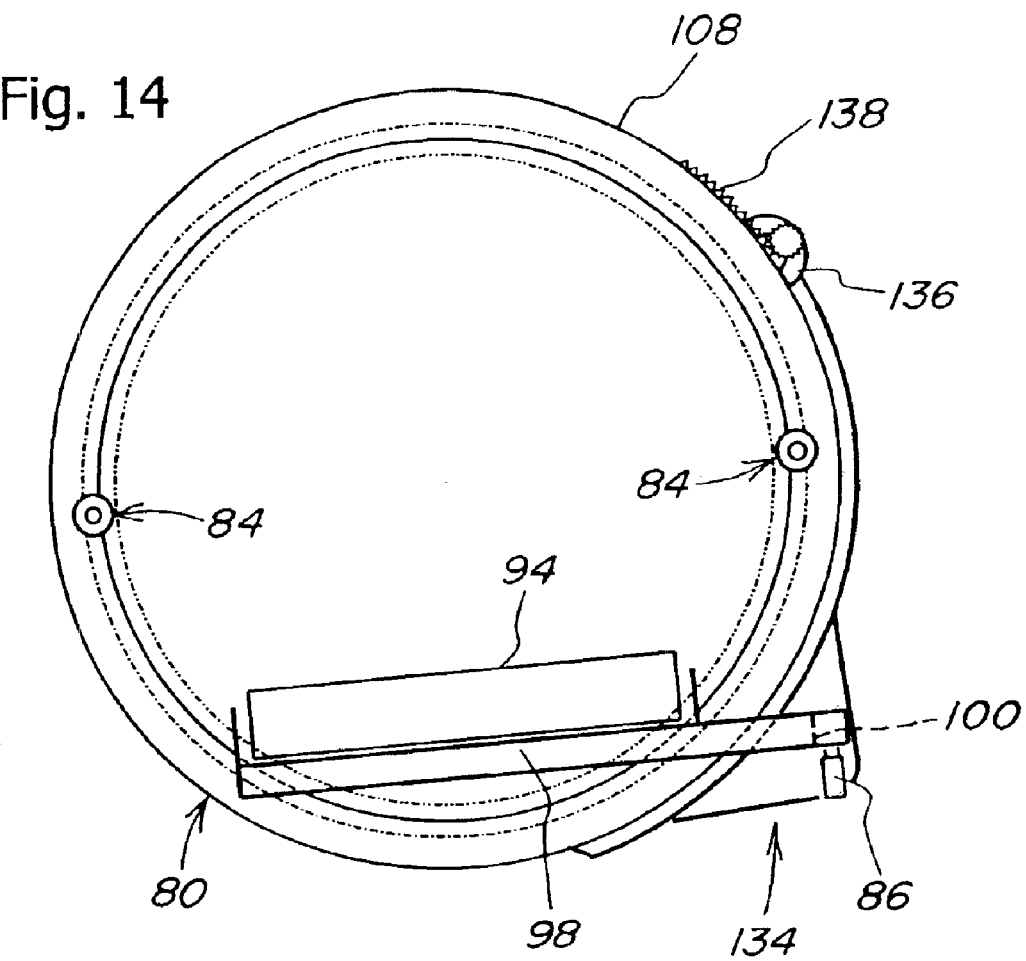
FIG. 14 is a rear view of the wrapping implement according to FIG. 13.
Figure 15:
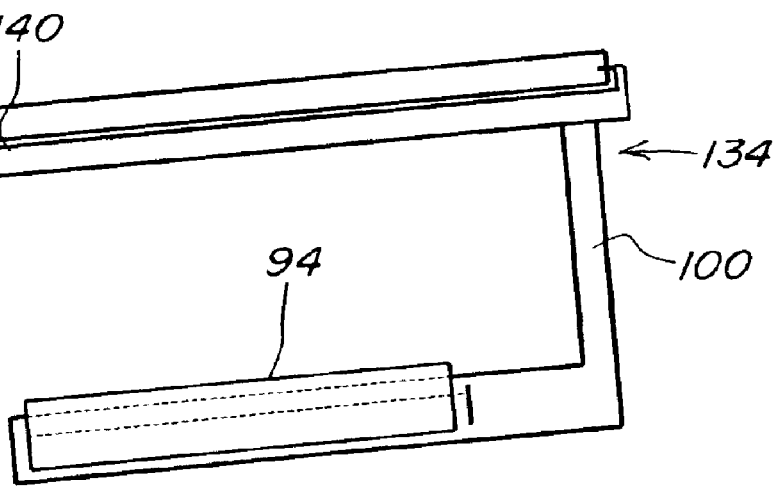
FIG. 15 is a plan view of the wrapping implement of the combination according to FIG. 13.

The operation of this second embodiment is described as follows. As soon as the cylindrical bale 44 lies upon the conveying table 52, the actuating arrangement 58' is extended and the slide 60 moves in the guidance arrangement 54 to the rear and upward, so that the cylindrical bale 44 is conveyed to the carrier 82. As soon as the slide 60 has reached its rear end position, the hook 124 grasps the retainer 120 and holds it rigidly in this position. The actuating arrangement 58' is extended further and the conveying table 52 pivots upward about the bearing 64, in the clockwise direction as seen in FIG. 10, in order to deposit the cylindrical bale 44 on the carrier 82, until it rests on the pulley 94. Following this, the actuating arrangement 58' is either drained of its pressure so that it is lowered, or pressure is applied to it and it retracts. As a result, the conveying table 52 is also lowered, and except for the rear roll 68, is released from the circumferential surface of the cylindrical bale 44. In the condition that now obtains and is shown in FIG. 11, the wrapping process can be performed as in the case of the first embodiment. As soon as the wrapping process is ended and the carrier 82 is tilted to the rear and downward, as is shown in FIG. 12, in order to deposit the cylindrical bale 44 on the ground, the extension of the carrier 82 presses on the linkage 126, this in turn on the lever 132, and thereby the hook nose 130 is lifted from the stop. The release of this positive lock now makes it possible for the actuating arrangement 58' to be retracted completely and to move the slide 60 with the conveying table 52 into its accepting position underneath the baling chamber 22, as shown in FIG. 12.

A further embodiment is illustrated in FIGS. 13 through 17, which generally follows the first embodiment, but is provided with another carrier 82'.

In contrast to the carrier 82 described so far, the carrier 82' now used is provided with only one lengthwise strut 100. For example, the strut 100 provided on the left side in the previous embodiments is missing. The carrier 82' is the approximate shape of a fork, which however, is repositioned by means of the actuating arrangement 86 in the same way as in the first or the second embodiment. However, the bearing 102 and the actuating arrangement 86 are not provided on the guidance housing 108, but on a sliding stand 134. The sliding stand 134 is curved corresponding to the guidance housing 108 and engages on its outer circumferential surface in a positive lock along a curve of approximately 90°. For example, an Omega or a hat profile and rolls could be provided that are used to accommodate the sliding stand 134 on the guidance housing 108. The sliding stand 134 is moved about the central axis of the guidance housing 108 by means of a motor 136, which engages in a sprocket 138 on the circumferential surface of the housing 108. Instead, a rope pull, a hydraulic cylinder, an electric motor or the like could be used, that cause at least an upward movement, while the downward movement is performed by the force of gravity alone.

While the wrapping operation with this carrier 82' corresponds to that of the other embodiments, this embodiment is provided with another and possibly additional deposit possibility, while the previous possibilities using the actuating arrangement 86 remain in effect.

Figure 16:
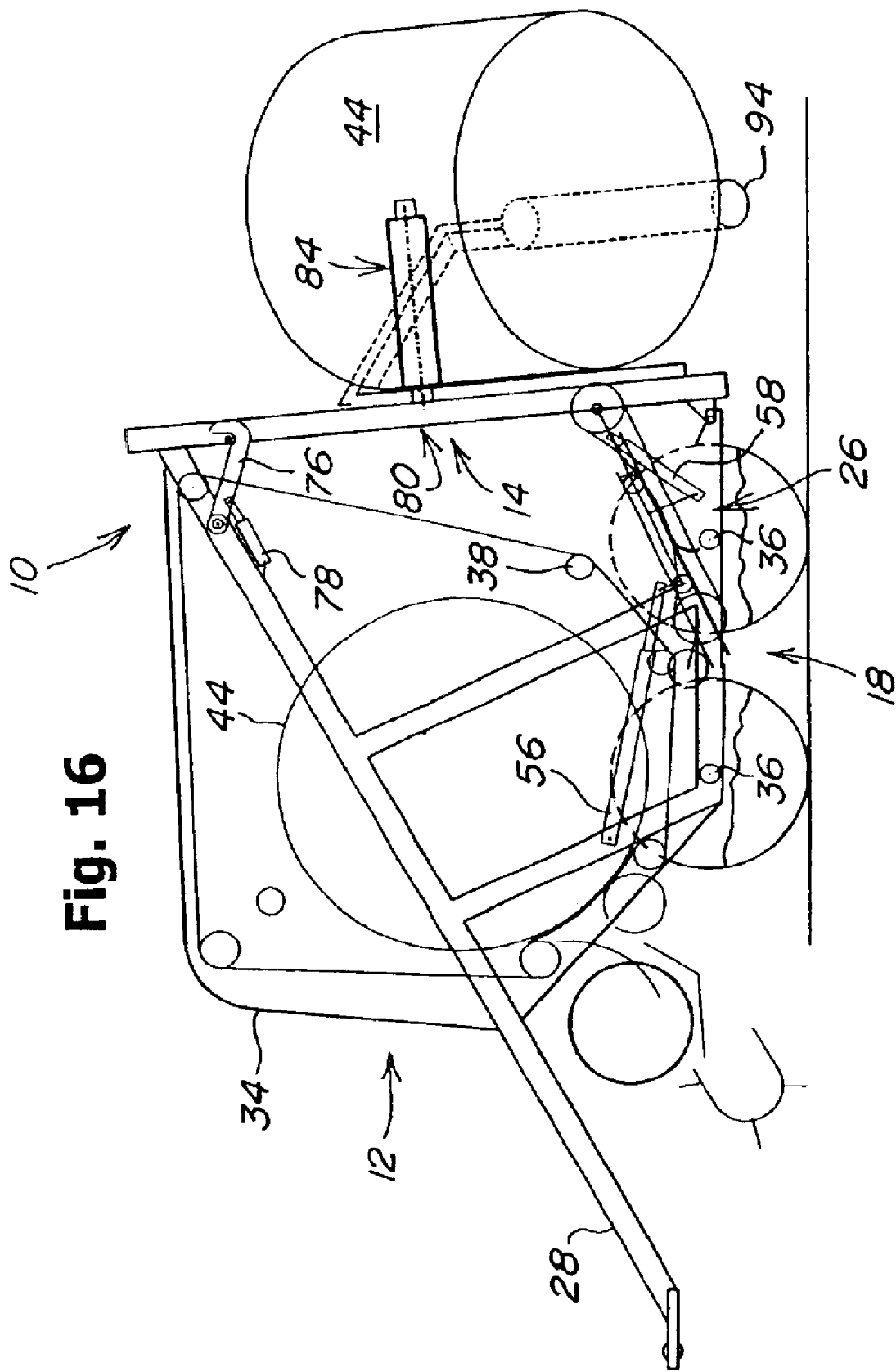
FIG. 16 is a side view of the combination according to FIG. 13 during the delivery of a cylindrical bale.
Figure 17:
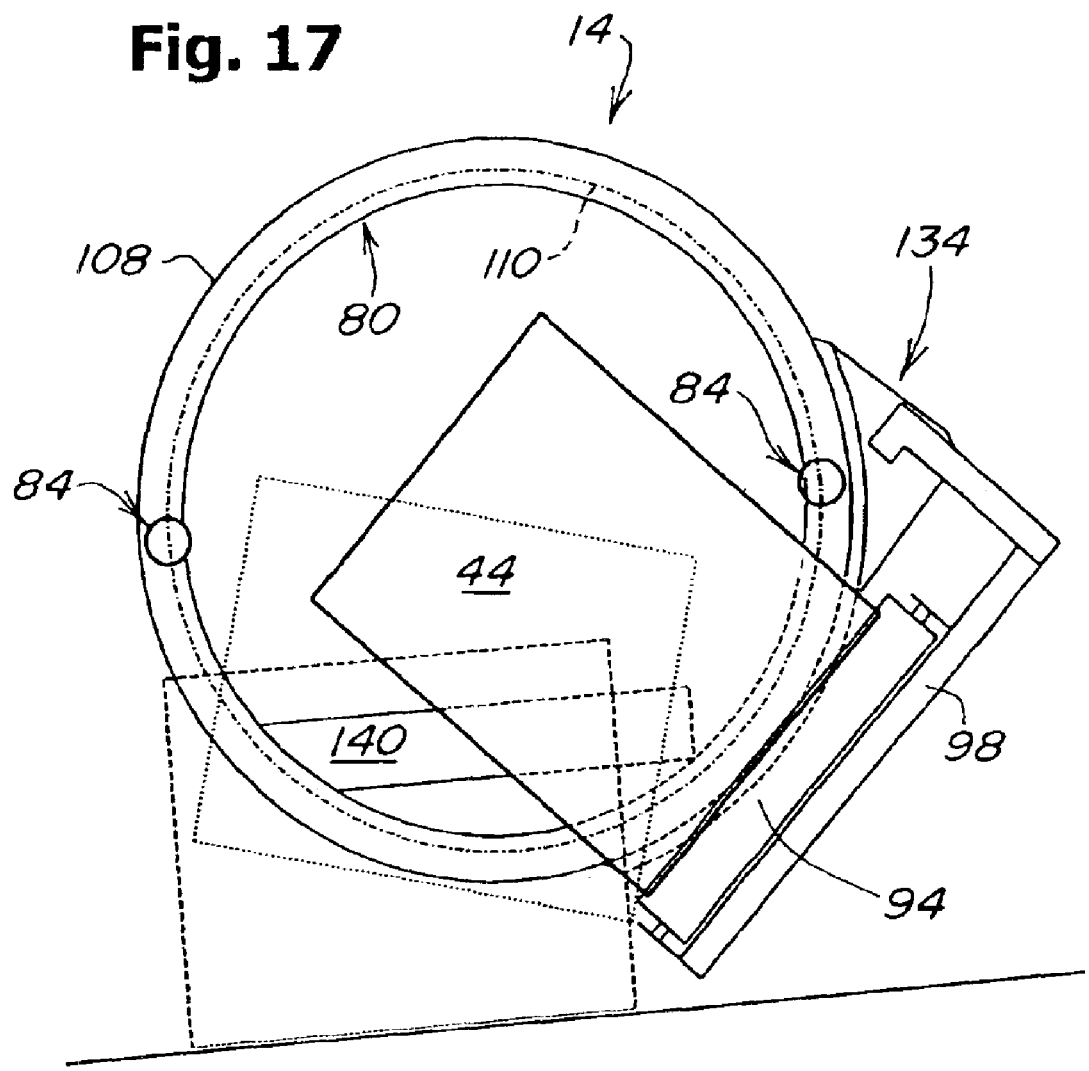
FIG. 17 is a rear view of the wrapping implement according to FIG. 13 during the delivery of the cylindrical bale.

A further advantage of this carrier 82' consists of the fact that it can deposit the cylindrical bale 44 on its end face, as it is shown in FIGS. 16 and 17. This type of deposit is particularly advantageous on a slope, since the cylindrical bale 44 cannot roll away. As can be seen, in particular, from FIG. 17, the sliding stand 134 can be pivoted about the horizontal lengthwise axis of the wrapping implement 14 so far until the roll 94 and a buttress 140 located opposite them, assume an inclination of approximately 45° to the ground, the buttress taking up a load only when the roll 68 of the conveying table 52 is not located in its rear end position. The buttress 140 may be a sheet metal plate, a roll, a strut or the like. In this position, the cylindrical bale 44 will tilt over the lower edge of the roll 94 and the buttress 140, and land on its end face and remain lying there. Depending on the configuration and the size of the cylindrical bale 44, the tilting may occur earlier or later, with the timing in any case depending on when the center of gravity comes to lie to the side of the lower edge of the roll 94. As soon as the cylindrical bale 44 has been deposited and the combination 10 has been operated past it, the carrier 82' can be pivoted again into its original horizontal position, in which it can accept a new cylindrical bale 44.

Figure 19:
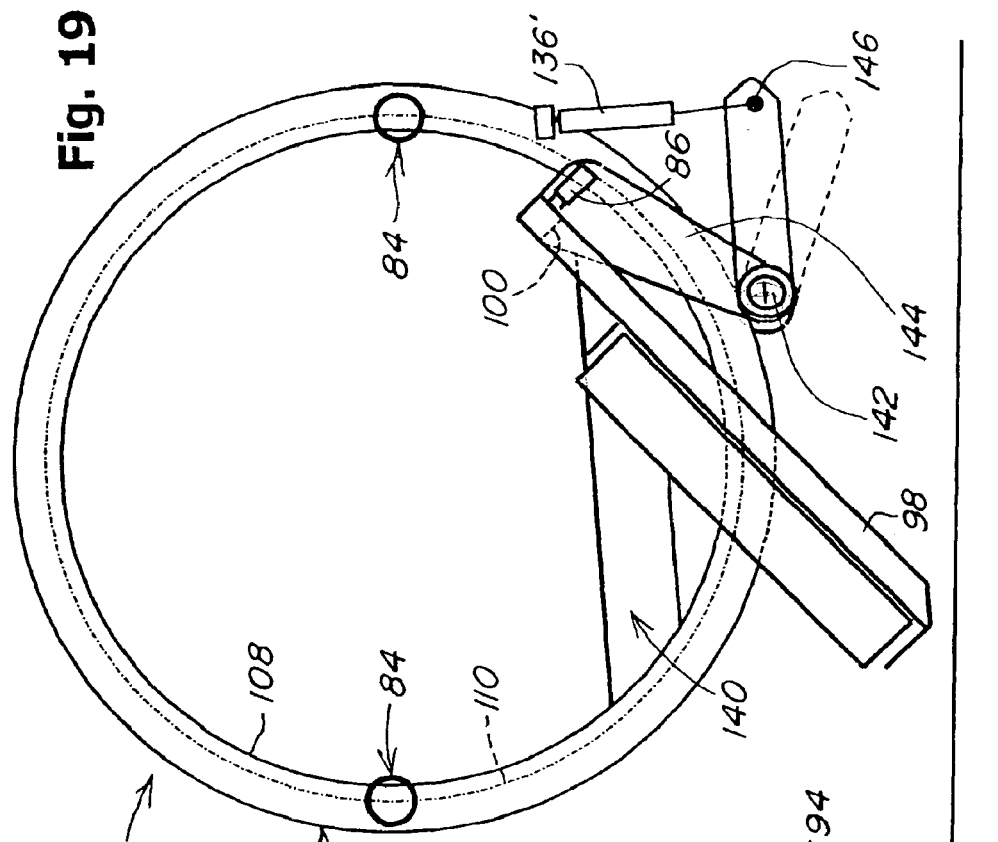
FIG. 19 is a rear view of the wrapping implement of the combination according to FIG. 18 during the delivery of the cylindrical bale.
Figure 18:
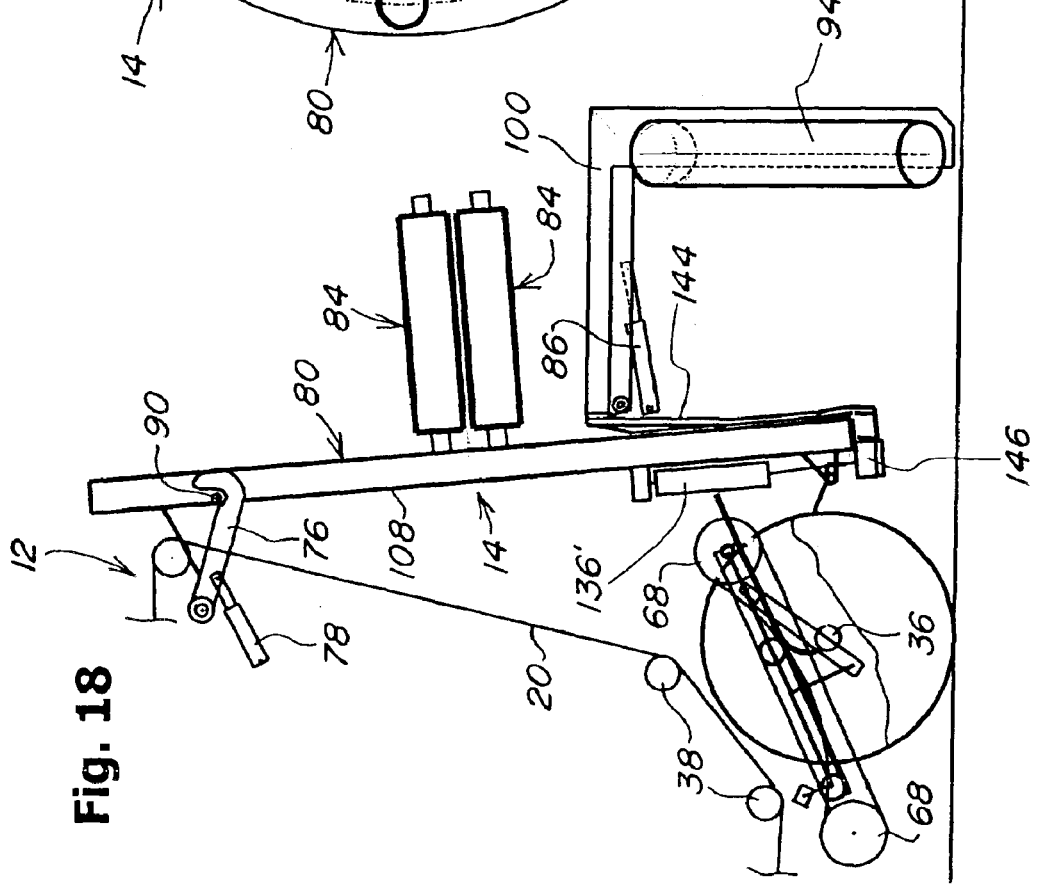
FIG. 18 is a schematic side view of a combination of a large round baler with a wrapping implement according to a fourth embodiment with a conveyor and a pivoted carrier.

The fourth embodiment, as shown in FIGS. 18 and 19, corresponds generally to the third embodiment. However, the deposit of the cylindrical bale 44 on its end face is performed in a different manner. The configuration of the large round baler 12 and the conveyor 26 corresponds to that of the previous embodiments.

In contrast to the third embodiment, the carrier 82 is not fastened to a sliding stand 134, but can be pivoted about a horizontal axis 142, extending generally in the direction of operation on which an arm 144 is supported in bearings, free to pivot.

The axis 142 engages, on the one hand, the guidance housing 108, and on the other hand, the arm 144, rigidly or movably. The axis 142 is configured as a steel journal or the like and is preferably oriented with a slight inclination to the direction of operation, particularly to the side. The axis 142 or the shaft extends to the rear past the guidance housing 108 in order to take up the arm 144, and extends to the front in order to be connected with a lever arm 146.

The arm 144 is rigidly connected with the lengthwise strut 100 and extends in a plane oriented parallel to the transverse strut 98. The arm 144 extends very close to the guidance housing 108 and the buttress 140. Between the arm 144 and the lengthwise strut 100, the third actuating arrangement 86 extends, which brings the carrier 82 into its take-up and delivery position, as already described above.

The lever arm 146 extends radially from the axis 142 and is connected at its end with a motor 136'. In the embodiment shown, the lever arm 146 extends in front of the guidance housing 108 and can be repositioned between an approximately 3 o'clock and an approximately 5 o'clock position, as considered when viewing the wrapping implement 14 from the rear.

The motor 136' is configured as a single-acting or as a double-acting hydraulic cylinder, that is connected at its other end to the guidance housing 108, free to pivot. The motor 136' is again repositioned automatically, that is, extended or retracted, preferably by means of an on-board computer using electromagnetic valves, not shown.

On the basis of the foregoing description the fourth embodiment operates, as follows. The formation, the wrapping, the delivery and the transport of the cylindrical bale 44 to the carrier 82, and the enveloping of it with foil is performed in the manner described previously. In this position, the motor 136' is extended and the carrier 82 with its roll 94 extend in a horizontal plane. As soon as the wrapping process is completed and the cylindrical bale 44 can be deposited on the ground, the motor 136' is retracted and the carrier 82 tilts about or with the axis 142 in the counterclockwise direction as seen in FIG. 19, until it is inclined approximately 45° to the ground. In this position, the cylindrical bale 44 falls onto its end face. If the cylindrical bale 44 is to be deposited on its circumferential surface, the motor 136' remains rigid and the actuating arrangement 86 is operated so that the cylindrical bale 44 reaches the ground in its usual manner.

Having described the preferred embodiment, it will become apparent that various modifications can be made without departing from the scope of the invention as defined in the accompanying claims.

What is claimed is:

1. In a combination of a large round baler having a main frame supported on wheels for travel over the ground and carrying a bale-forming arrangement defining a circumferential portion of a baling chamber and being selectively operable for discharging a bale, formed within said chamber, to the rear, and a wrapping implement carried by the frame, the improvement comprising: said wrapping implement being operable to wrap a discharged bale prior to it being deposited on the ground and including a substantially vertically oriented circular guide ring mounted to a rear location of said main frame in a location permitting a discharged bale to pass through said guide ring; a bale carrier being mounted to a lower rear location of said guide ring in a location for receiving said discharged bale; and a wrapping material carrier extending rearwardly from and being mounted for movement along said guide ring for dispensing material for wrapping a discharged bale supported by said bale carrier.

2. The combination, as defined in claim 1, wherein said wrapping implement is mounted for being selectively detached as a unit from said main frame of said round baler.

3. The combination, as defined in claim 2, wherein said bale carrier is mounted to a rear side of said guide ring for pivoting vertically about a horizontal axis extending perpendicular to a direction occupied by a central axis of said guide ring; and a parking stand being mounted to a forward side of said guide ring and cooperating with said bale carrier to support said wrapping implement in a detached, park position wherein said guide ring remains in a substantially vertical disposition.

4. The combination, as defined in claim 1, wherein said bale carrier includes a support roll having a rotational axis which is horizontal and extends perpendicular to a direction occupied by a central axis of said guide ring, when said bale carrier is in a wrapping position.

5. The combination, as defined in claim 4, wherein said bale carrier is mounted for pivoting about an axis extending parallel to a central axis of said guide ring; and a buttress forming a chord spanning an interior location of said guide ring and being on an opposite side of said bale carrier for cooperating with said support roll for retaining a bale on said bale carrier when said bale carrier is in said wrapping position.

6. The combination, as defined in claim 4, wherein said bale carrier is U-shaped with opposite legs extending forwardly from a transverse bight section to which said bale support roll is mounted; said opposite legs having respective forward ends pivotally mounted to said guide ring for permitting said bale carrier to be swung vertically between a raised first position, for supporting a bale to be wrapped, and a lowered second position for ejecting a wrapped bale; and an ejection aid being mounted to said guide ring at a location between said opposite legs so as to engage and lift a bale carried by said bale carrier when the bale carrier is moved from said first to said second position.

7. The combination, as defined in claim 1, wherein said bale carrier is mounted to said guide ring for pivoting vertically about a horizontal axis extending perpendicular to a direction occupied by a central axis of said guide ring.

8. The combination, as defined in claim 1, wherein said wrapping material carrier is secured to a rotatable ring mounted within said guide ring; and a rotatable ring drive motor mounted to said guide ring and coupled for driving said rotatable ring.

9. The combination, as defined in claim 1, wherein said bale carrier is defined by an open framework which permits said wrapping material carrier to move along an entire circumference of said guide ring without interfering with said bale carrier.

10. The combination, as defined in claim 1, wherein said wrapping implement includes upper and lower connecting elements fixed to said guide ring and affording respective attachment points for quick-coupling said wrapping implement to said main frame of said round baler.

11. The combination, as defined in claim 1, wherein said bale carrier is mounted to said guide ring for adjustment along a circumferential surface of said guide ring.

12. The combination, as defined in claim 1, wherein said baler includes a conveyor located in a first position for receiving a bale discharged from said baling chamber; and said conveyor being mounted to said main frame of said baler for movement between said first position and a position close to said guide ring from which said bale may be deposited onto said bale carrier.

13. The combination, as defined in claim 12, wherein said conveyor includes a rear first conveyor roll which extends parallel to, and cooperates with, said bale support roll of said bale carrier to support a bale during transfer of the bale from the conveyor to the bale carrier.

14. The combination, as defined in claim 13, wherein said conveyor includes a front second conveyor roll which cooperates with said rear first conveyor roll to support a bale received from said baling chamber.

15. The combination, as defined in claim 1, wherein said baler includes a conveyor mounted to said main frame in a location for receiving a bale discharged from said baling chamber; and said conveyor having at least a portion which is mounted for pivoting vertically relative to a remaining portion of said conveyor in order to deposit a bale on the ground, in the absence of a wrapping implement being connected to said main frame of said baler.

16. The combination, as defined in claim 1, wherein said baler includes a conveyor mounted on said main frame in a location for receiving a bale discharged from said baling chamber; said conveyor including a bale-supporting section mounted for fore-and-aft movement between a forward bale-receiving position and a rearward bale transfer position; and latching structure mounted to said bale wrapping implement for automatically latching said conveyor in said bale transfer position.

17. The combination, as defined in claim 1, wherein said bale carrier is mounted to said guide ring for pivoting vertically about one of a horizontal transverse axis, or a fore-and-aft extending axis; an actuating device coupled between said guide ring and said bale carrier for effecting vertical adjustment of said bale carrier; and said actuating device including structure resiliently supporting said bale carrier.

* * * * *